US012655795B1

(12) United States Patent
Sibbach et al.

(10) Patent No.: US 12,655,795 B1
(45) Date of Patent: Jun. 16, 2026

(54) GAS TURBINE ENGINE HAVING A ROTOR ASSEMBLY AND A FLOW SPLITTER

(71) Applicant: GENERAL ELECTRIC COMPANY, Evendale, OH (US)

(72) Inventors: Arthur William Sibbach, Boxford, MA (US); Nicholas Joseph Kray, Mason, OH (US); Brandon Wayne Miller, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/182,056

(22) Filed: Apr. 17, 2025

(51) Int. Cl.
| | |
|---|---|
| *F02C 7/04* | (2006.01) |
| *F02C 3/00* | (2006.01) |
| *F02C 7/28* | (2006.01) |

(52) U.S. Cl.
CPC ................. *F02C 7/04* (2013.01); *F02C 3/00* (2013.01); *F02C 7/28* (2013.01)

(58) Field of Classification Search
CPC ........ Y02T 50/60; F01D 11/008; F01D 5/225; F01D 5/22; F01D 5/16; F02K 3/06; F02K 3/075; F02K 3/00; F05D 2220/36; F02C 7/04; F02C 7/042; F02C 7/05
See application file for complete search history.

(56) References Cited

U.S. PATENT DOCUMENTS

| | | | | | |
|---|---|---|---|---|---|
| 3,143,383 | A | * | 8/1964 | Bamberger | F02C 7/30 428/656 |
| 3,708,244 | A | * | 1/1973 | Dawson | F01D 5/22 416/196 R |
| 4,650,399 | A | * | 3/1987 | Craig | F01D 5/147 416/193 A |
| 5,161,949 | A | * | 11/1992 | Brioude | F04D 29/322 416/193 A |
| 5,236,307 | A | * | 8/1993 | Ng | F04D 27/0246 416/198 A |
| 5,464,326 | A | * | 11/1995 | Knott | F01D 11/008 416/193 A |
| 5,562,419 | A | * | 10/1996 | Crall | F02K 3/02 416/190 |

(Continued)

FOREIGN PATENT DOCUMENTS

| | | | | | |
|---|---|---|---|---|---|
| CN | 116591827 A | * | 8/2023 | | F01D 5/22 |
| EP | 0950808 A2 | * | 10/1999 | | F02K 3/068 |

*Primary Examiner* — Craig Kim
(74) *Attorney, Agent, or Firm* — McGarry Bair PC

(57) ABSTRACT

A gas turbine engine including a fan section, a compressor section, a combustion section, and a turbine section in serial flow arrangement, with the compressor section, the combustion section, and the turbine section defining an engine core, wherein the fan section includes a rotor assembly defining a rotational axis, the rotor assembly including a first blade and a second blade circumferentially spaced about the rotational axis to define an intervening gap, a rotor receiving a portion of the first blade and a portion of the second blade, and a flow splitter located within the intervening gap, wherein the flow splitter defines at least a portion of a working airflow passage fluidly coupled to the engine core, and wherein the flow splitter defines at least a portion of an exterior airflow passage that is fluidly coupled with at least a portion of the gas turbine engine outside the engine core.

20 Claims, 7 Drawing Sheets

(56)                    References Cited

U.S. PATENT DOCUMENTS

| | | | | |
|---|---|---|---|---|
| 5,988,980 A * | 11/1999 | Busbey | F01D 11/001 | |
| | | | 415/78 | |
| 6,217,283 B1 * | 4/2001 | Ravenhall | F01D 5/225 | |
| | | | 416/193 A | |
| 6,514,045 B1 | 2/2003 | Barton | | |
| 7,153,099 B2 | 12/2006 | Queriault | | |
| 7,284,958 B2 | 10/2007 | Dundas | | |
| 7,758,311 B2 * | 7/2010 | Loehle | F01D 5/34 | |
| | | | 416/500 | |
| 8,066,479 B2 * | 11/2011 | El-Aini | F01D 5/26 | |
| | | | 416/193 A | |
| 8,529,208 B2 | 9/2013 | Brault et al. | | |
| 9,145,784 B2 | 9/2015 | Evans | | |
| 9,200,593 B2 | 12/2015 | Huth | | |
| 9,228,444 B2 * | 1/2016 | Evans | F01D 5/225 | |
| 9,328,619 B2 * | 5/2016 | Chouhan | F01D 5/22 | |
| 9,506,353 B2 * | 11/2016 | Schwarz | F04D 29/666 | |
| 10,156,151 B2 * | 12/2018 | Thomas | B29C 70/222 | |
| 10,563,666 B2 * | 2/2020 | Murdock | F02K 3/06 | |
| 10,605,117 B2 | 3/2020 | Wang | | |
| 10,619,483 B2 * | 4/2020 | Voytovych | F01D 5/34 | |
| 10,689,996 B2 * | 6/2020 | Notarianni | F01D 11/008 | |
| 10,822,969 B2 * | 11/2020 | Husband | F01D 5/3053 | |
| 11,149,552 B2 * | 10/2021 | DiPietro, Jr. | F01D 5/141 | |
| 11,913,355 B2 * | 2/2024 | Kray | F02K 3/06 | |
| 12,037,921 B2 * | 7/2024 | Kray | F01D 5/146 | |
| 12,409,945 B2 * | 9/2025 | Suk | F01D 5/022 | |
| 2009/0269203 A1 * | 10/2009 | Care | F01D 25/06 | |
| | | | 416/221 | |
| 2011/0243709 A1 * | 10/2011 | El-Aini | F01D 5/26 | |
| | | | 415/119 | |
| 2012/0244008 A1 * | 9/2012 | Chang | F04D 29/666 | |
| | | | 416/244 R | |
| 2014/0086751 A1 * | 3/2014 | Bottome | F01D 11/008 | |
| | | | 416/193 R | |
| 2014/0212295 A1 * | 7/2014 | Kray | F01D 5/02 | |
| | | | 416/245 R | |
| 2014/0255207 A1 * | 9/2014 | Boyer | F01D 5/186 | |
| | | | 416/196 R | |
| 2015/0247414 A1 * | 9/2015 | Uskert | F01D 5/282 | |
| | | | 416/193 A | |
| 2016/0245087 A1 * | 8/2016 | Pesatori | F01D 5/28 | |
| 2017/0101878 A1 | 4/2017 | Wang | | |
| 2018/0017079 A1 * | 1/2018 | DiPietro, Jr. | F04D 25/045 | |
| 2018/0119707 A1 * | 5/2018 | Murdock | F02K 3/06 | |
| 2019/0153866 A1 * | 5/2019 | Voytovych | F04D 29/326 | |
| 2020/0340400 A1 * | 10/2020 | Bryan | F01D 17/162 | |
| 2021/0180458 A1 * | 6/2021 | DiPietro, Jr. | F01D 5/142 | |
| 2024/0044253 A1 * | 2/2024 | Kray | F02K 3/06 | |

* cited by examiner

400

401 Direct inner airflow

402 Direct outer airflow

GAS TURBINE ENGINE HAVING A ROTOR ASSEMBLY AND A FLOW SPLITTER

TECHNICAL FIELD

The present subject matter relates generally to a gas turbine engine having a rotor assembly, the rotor assembly including a flow splitter.

BACKGROUND

Gas turbine engines are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The gas turbine engine is arranged as an engine core comprising at least a compressor section, a combustor section, and a turbine section in axial flow arrangement and defining at least one rotating element or rotor and at least one stationary component or stator.

Gas turbine engines come in different configurations, such as a turboprop engine, which is a gas turbine engine that drives an aircraft propeller, a turbofan engine, which is a gas turbine engine with a fan upstream of the engine core, with both the fan and the engine core being received within a nacelle, and a propfan gas turbine engine, which is also called an unducted gas turbine engine. The unducted gas turbine engine includes embodiments of both turboprop engine and the turbofan engine. For example, an unducted gas turbine engine includes a set of rotating blades, or propellers, on the exterior of the engine casing similar to a turboprop, without the rotating blade being constrained within the nacelle. The lack of a nacelle or other casing surrounding the rotating blades of the fan section, lead to the name of an "unducted" fan or propfan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
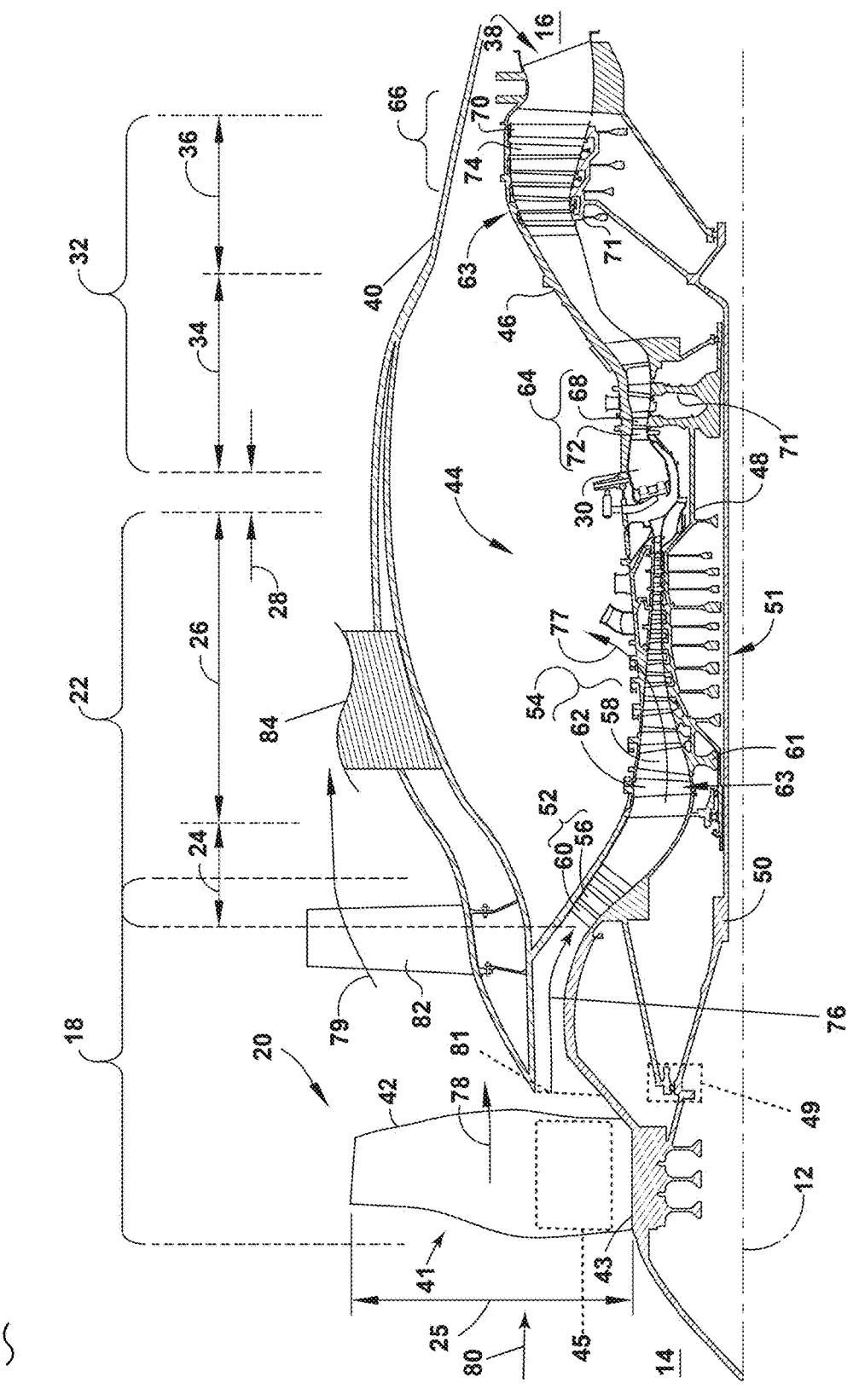
FIG. 1 is a schematic cross-sectional view of a gas turbine engine, in accordance with various embodiments described herein.

Embodiments of the disclosure described herein are directed to a fan section of a gas turbine engine. The gas turbine engine includes an engine core having a compressor section, a combustion section, and a turbine section. The fan section includes a rotor assembly defining a rotational axis. The rotor assembly includes a first blade, and a second blade circumferentially spaced from the first blade, with respect to the rotational axis. A flow splitter is located circumferentially between the first blade and the second blade, with respect to the rotational axis.

The flow splitter mechanically strengthens the rotor assembly, particularly the first blade and the second blade, while also guiding airflow downstream of the rotor assembly. The flow splitter directs a first flow of air into the engine core to define a working airflow. The flow splitter directs a second flow of air to other portions of the gas turbine engine outside the engine core to define an exterior flow. In order to prevent foreign objects debris (FOD) from being ingested into the engine core during operation of the gas turbine engine, an inlet of the engine core can have a low frontal profile. However, the low frontal profile of the inlet of the engine core can cause the gas turbine engine to be starved for air under some operating conditions. By splitting airflow into multiple flow paths with the working airflow being located radially inward from the exterior airflow with respect to the rotational axis, a higher total pressure of air is provided from the fan section to the engine core compared to a fan section without a flow splitter, which improves airflow through the inlet of the engine core and into the engine core. Further, a higher operating pressure ratio (OPR) from an inlet of the gas turbine engine to an outlet of a compressor of the gas turbine engine is achieved compared to a fan section without a flow splitter. The higher OPR results in increased engine efficiency.

While described with respect to a gas turbine engine for an aircraft, it should be appreciated that the rotor assembly as described herein can be for any gas turbine engine. Embodiments of the disclosure discussed herein can have general applicability within non-aircraft gas turbine engines, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within a gas turbine engine or vehicle and are based on a normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "fluid" can be a gas or a liquid. The term "fluidly coupled" means that a fluid is capable of making the connection between the areas specified.

As used herein, the terms "axial" and "axially" refer to directions and orientations that extend substantially parallel to a centerline axis. Moreover, the terms "radial" and "radially" refer to directions and orientations that extend substantially perpendicular to the centerline. For example, in context of a rotor assembly, "radial" refers to a direction along a ray extending between a rotational axis of the rotor assembly and an outer rotor assembly circumference. In addition, as used herein, the terms "circumferential" and "circumferentially" refer to directions and orientations that extend arcuately about the centerline of the gas turbine engine. As used herein, "axially extending" refers to a vector having an axial component and "radially extending" refers to a vector having a radial component. It should be understood that "axially extending" and "radially extending" can include vectors having other components besides an axial component and a radial component, respectively.

The terms "coupled," "fixed," "applied to," "attached to" and the like refer to both direct coupling, fixing, or attaching, as well as indirect coupling, fixing, or attaching through one or more intermediate components or features, unless otherwise specified herein.

All directional references (e.g., radial, axial, above, below, upstream, downstream, forward, aft, etc.) are only used for identification purposes to aid the reader's understanding of the present disclosure, and do not create limitations, particularly as to the position, orientation, or use of embodiments of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one. Uses of "and" and "or" are to be construed broadly. For example, and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about" and "generally" are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fiber, polymeric resin, thermoplastic, bismaleimide (BMI), polyimide materials, epoxy resin, glass fiber, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic components (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers can be impregnated with a slurry composition prior to forming the preform or after formation of the preform. The preform may then undergo thermal processing and subsequent chemical processing, such as melt-infiltration with silicon, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

The reinforcing fibers can be at least portions of individual filaments or strands. As used herein, a "ceramic fiber tow," a "fiber tow," or simply a "tow" refers to a bundle of a plurality of individual fibers, filaments, or loose strands. The filaments of a tow may be randomly intermingled or arranged in a pattern, and/or may be continuous or noncontinuous. For example, a tow may include broken filaments or filament segments. As another example, the filaments of a tow may be substantially parallel, twisted, or otherwise arranged. A tow may act substantially in the same manner as a single or individual filament. It will also be appreciated that an "individual ceramic filament," or simply an "individual filament," as used herein, refers to a singular or non-bundled elongate ceramic member.

Such materials, along with certain monolithic ceramics (i.e., ceramic materials without a reinforcing material), are particularly suitable for higher temperature applications. Additionally, these ceramic materials are lightweight compared to superalloys yet can still provide strength and durability to the component made therefrom. Therefore, such materials are currently being considered for many gas turbine components used in higher temperature sections of gas turbine engines, such as airfoils (e.g., turbine blades, and vanes), combustors, shrouds and other like components, that would benefit from the lighter-weight and higher temperature capability these materials can offer.

FIG. 1 is a schematic cross-sectional diagram of a gas turbine engine 10, specifically an open rotor or unducted gas turbine engine for an aircraft. The gas turbine engine 10 has a longitudinally extending axis or engine centerline 12 extending from a forward end 14 to an aft end 16. The gas turbine engine 10 includes, in downstream serial flow arrangement, a set of circumferentially spaced blades or propellers defining a fan section 18 including a fan 20, a; compressor section 22 including a booster or low pressure (LP) compressor 24 and a high pressure (HP) compressor 26, a combustion section 28 including a combustor 30, a turbine section 32 including a high pressure (HP) turbine 34, and a low pressure (LP) turbine 36, and an exhaust section 38. The gas turbine engine 10 as described herein is meant as a non-limiting example, and other architectures are possible, such as, but not limited to, a steam gas turbine engine, a supercritical carbon dioxide gas turbine engine, or any other suitable gas turbine engine.

An exterior surface defined by a housing 40 of the gas turbine engine 10 extends from the forward end 14 of the gas turbine engine 10 toward the aft end 16 of the gas turbine engine 10 and covers at least a portion of the compressor section 22, the combustion section 28, the turbine section 32, and the exhaust section 38. The fan section 18 can be positioned at a forward portion of the housing 40 and extend radially outward from the housing 40 of the gas turbine engine 10. Specifically, the fan section 18 extends radially outward from the housing 40. The fan section 18 includes a rotor assembly 41 including a set of fan blades 42 received by a rotor 43 and a flow splitter 45 (illustrated in phantom lines). The fan section 18 also includes a set of stationary fan vanes 82 downstream the set of fan blades 42, both disposed radially about the engine centerline 12. The gas turbine engine 10 includes any number of one or more sets of rotating blades or propellers (e.g., the set of fan blades 42) disposed upstream of the set of stationary fan vanes 82. As a non-limiting example, the gas turbine engine 10 can include multiple sets of fan blades 42 or the set of stationary fan vanes 82. As such, the gas turbine engine 10 can be further defined as an unducted single-fan gas turbine engine. The gas turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the housing 40 of the gas turbine engine 10.

An HP shaft or spool 48 disposed coaxially about the engine centerline 12 of the gas turbine engine 10 drivingly connects the HP turbine 34 to the HP compressor 26. An LP shaft or spool 50, which is disposed coaxially about the engine centerline 12 of the gas turbine engine 10 within the larger diameter annular of the HP shaft or spool 48, drivingly connects the LP turbine 36 to the LP compressor 24 and fan 20. The HP shaft or spool 48 and the LP shaft or spool 50 are rotatable about the engine centerline 12 and couple to a set of rotatable elements, which collectively define a rotor 51.

It will be appreciated that the gas turbine engine 10 is either a direct drive or integral drive engine utilizing a reduction gearbox coupling the LP shaft or spool 50 to the fan 20. The gas turbine engine 10 can include a power gearbox 49.

The LP compressor 24 and the HP compressor 26, respectively, include a respective set of LP compressor stages 52 and HP compressor stages 54, in which a respective set of LP compressor blades 56 and HP compressor blades 58 rotate relative to a respective corresponding set of LP static compressor vanes 60 and HP static compressor vanes 62 (also called a nozzle) to compress or pressurize the stream of fluid passing through the stage. An LP compressor stage of the set of LP compressor stages 52 and an HP compressor stage of the set of HP compressor stages 54 each include a corresponding plurality of LP compressor blades 56 and HP compressor blades 58 that can be provided in a ring and extend radially outwardly relative to the engine centerline 12, from a blade platform to a blade tip. The corresponding LP static compressor vanes 60 and HP static compressor vanes 62 are positioned upstream of and adjacent to the respective LP compressor blades 56 and HP compressor blades 58. It is noted that the number of blades, vanes, and compressor stages shown in FIG. 1 were selected for illustrative purposes only, and that other numbers are possible.

The LP compressor blades 56 and the HP compressor blades 58 for a stage of the compressor are mounted to a disk 61, which is mounted to the corresponding one of the HP shaft or spool 48 or LP shaft or spool 50, with each stage having its own disk 61. The LP static compressor vanes 60 and HP static compressor vanes 62 for a stage of the compressor are mounted to the engine casing 46 in a circumferential arrangement.

The HP turbine 34 and the LP turbine 36, respectively, include a set of HP turbine stages 64, and a set of LP turbine stages 66, in which a respective set of HP turbine blades 68 and LP turbine blades 70 are rotated relative to a respective corresponding set of HP static turbine vanes 72 and LP static turbine vanes 74 (also called a nozzle) to extract energy from the stream of fluid passing through the stage. An HP turbine stage of the set of HP turbine stages 64 and an LP turbine stage of the set of LP turbine stages 66 each include a corresponding plurality of HP turbine blades 68 and LP turbine blades 70 that can be provided in a ring and extend radially outwardly relative to the engine centerline 12, from a blade platform to a blade tip. The corresponding HP static turbine vanes 72 and LP static turbine vanes 74 are positioned upstream of and adjacent to the HP turbine blades 68 and LP turbine blades 70. It is noted that the number of blades, vanes, and turbine stages shown in FIG. 1 were selected for illustrative purposes only, and that other numbers are possible.

The HP turbine blades 68 and the LP turbine blades 70 for a stage of the turbine section 32 are mounted to a disk 71, which is mounted to the corresponding one of the HP shaft or spool 48 or the LP shaft or spool 50, with each stage having a dedicated disk 71. The set of HP static turbine vanes 72 and the set of LP static turbine vanes 74 for a stage of the turbine section 32 are mounted to the engine casing 46 in a circumferential arrangement.

Rotary portions of the gas turbine engine 10, such as the set of LP compressor blades 56, the set of HP compressor blades 58, the set of HP turbine blades 68, and the set of LP turbine blades 70, among the compressor section 22 and the turbine section 32 are also referred to individually or collectively as the rotor 51. As such, the rotor refers to the combination of rotating elements throughout the gas turbine engine 10.

Complementary to the rotor portion, the stationary portions of the gas turbine engine 10, such as the set of LP static compressor vanes 60, the set of HP static compressor vanes 62, the set of HP static turbine vanes 72, and the set of LP static turbine vanes 74, among the compressor section 22 and the turbine section 32 are also referred to individually or collectively as a stator 63. As such, the stator 63 refers to the combination of non-rotating elements throughout the gas turbine engine 10.

The housing 40 is operatively coupled to the gas turbine engine 10 and covers at least a portion of the engine core 44, the engine casing 46, or the exhaust section 38. At least a portion of the housing 40 can extend axially forward or upstream the illustrated position. For example, the housing 40 can extend axially forward such that a portion of the housing 40 overlays or covers a portion of the fan section 18 or a booster section (not illustrated) of the gas turbine engine 10.

During operation of the gas turbine engine 10, a freestream airflow 80 flows against a forward portion of the gas turbine engine 10. A portion of the freestream airflow 80 enters an annular area 25 defined by the swept area between the outer surface of the rotor 43 and the blade tip, with this air flow being an inlet airflow 78. The inlet airflow 78 is divided into a plurality of airflows by the flow splitter 45. A portion of the inlet airflow 78 enters the housing 40 through an engine core inlet 81 and is described as a working airflow 76. A portion of the working airflow 76 is used for combustion within the engine core 44. Another portion of the working airflow 76 can flow within the housing 40 but exterior to the engine casing 46 and is described as a bypass airflow or a third airflow. A portion of the inlet airflow 78 enters portions of the gas turbine engine 10 outside the engine core 44 and the housing 40 and is described as an exterior airflow 79.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the gas turbine engine 10 via the exhaust section 38. The driving of the LP turbine 36 drives the LP shaft or spool 50 to rotate the fan 20 and the LP compressor 24. The power gearbox 49 allows the fan 20 to rotate at a different speed from at least one of the set of LP compressor blades 56, the LP shaft or spool 50, and the HP shaft or spool 48. The working airflow 76, including the pressurized airflow and the combustion gases, defines a working airflow that flows through the compressor section 22, the combustion section 28, and the turbine section 32 of the gas turbine engine 10.

The exterior airflow 79 flows through the set of fan blades 42 and over the housing 40 of the gas turbine engine 10. Subsequently, the exterior airflow 79 flows over at least a portion of the set of stationary fan vanes 82, which directs the exterior airflow 79 such that it is transverse toward the engine centerline 12. The exterior airflow 79 then flows past the set of stationary fan vanes 82, following the curvature of the housing 40 and toward the exhaust section 38. A pylon 84 mounts the gas turbine engine 10 to an exterior structure (e.g., a fuselage of an aircraft, a wing, a tail wing, etc.).

The working airflow 76 and at least some of the exterior airflow 79 merge downstream of the exhaust section 38 of the gas turbine engine 10. The working airflow 76 and the exterior airflow 79, together, form an overall thrust of the gas turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the gas turbine engine 10. In the context of a gas turbine engine, the hot portions of the gas turbine engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
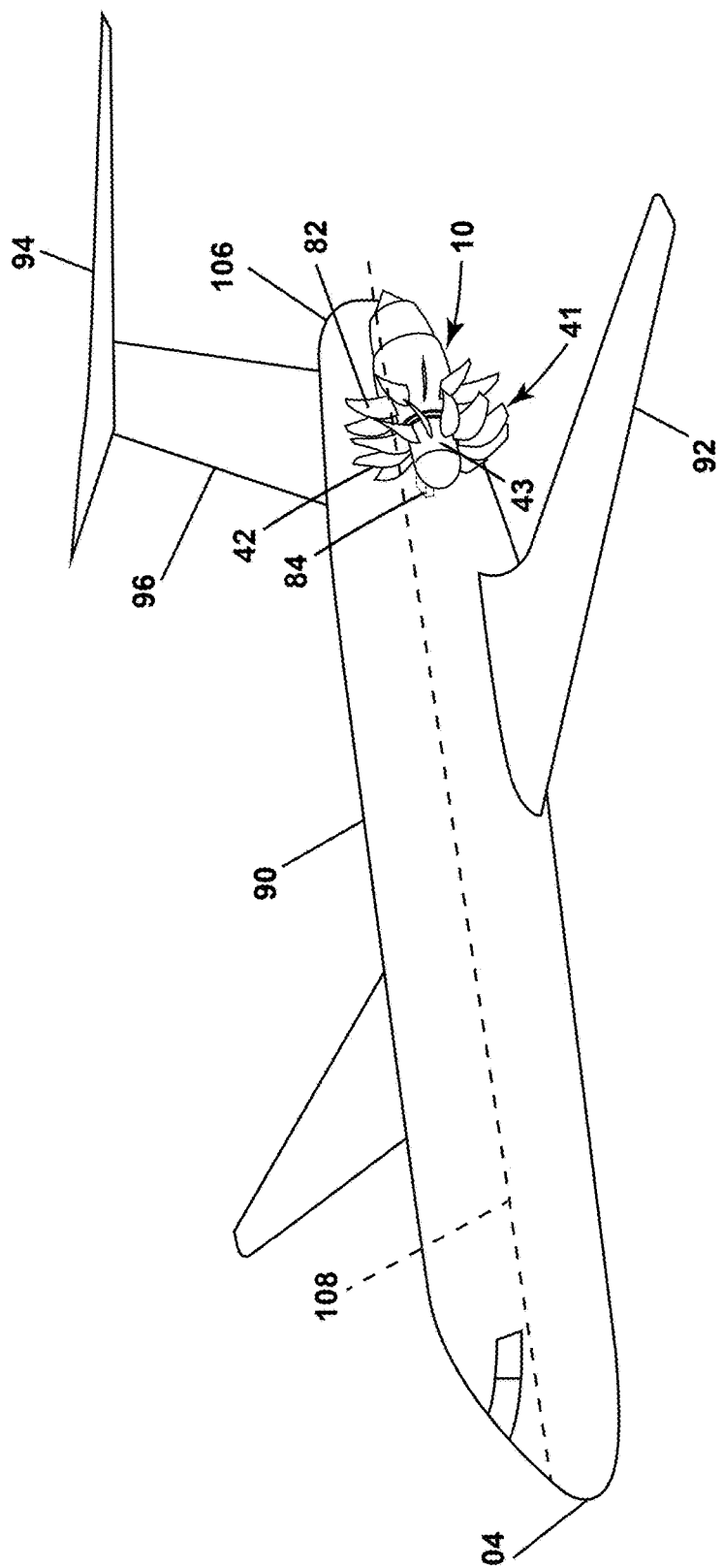
FIG. 2 is a schematic perspective view of an aircraft including the gas turbine engine of FIG. 1, in accordance with various embodiments described herein.

FIG. 2 is a schematic perspective view of an aircraft 86 including the gas turbine engine 10 of FIG. 1. The aircraft 86 includes a fuselage 90 with an exterior surface. At least one wing 92 and a tail wing 94 extend from the fuselage 90. The tail wing 94 is operably coupled to and spaced from the fuselage 90 via a tail wing pylon 96. The gas turbine engine 10 is operably coupled to the exterior surface of the fuselage 90 via a pylon 84. The gas turbine engine 10 includes the rotor assembly 41 including the set of fan blades 42 received by the rotor 43. The set of stationary fan vanes 82 is provided downstream of the set of fan blades 42. The fuselage 90 extends between a nose 104 and a tail 106 and includes a fuselage centerline 108 extending therebetween.

Additionally, while the tail wing 94 is illustrated as a T-wing tail wing, other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 94.

Figure 3:
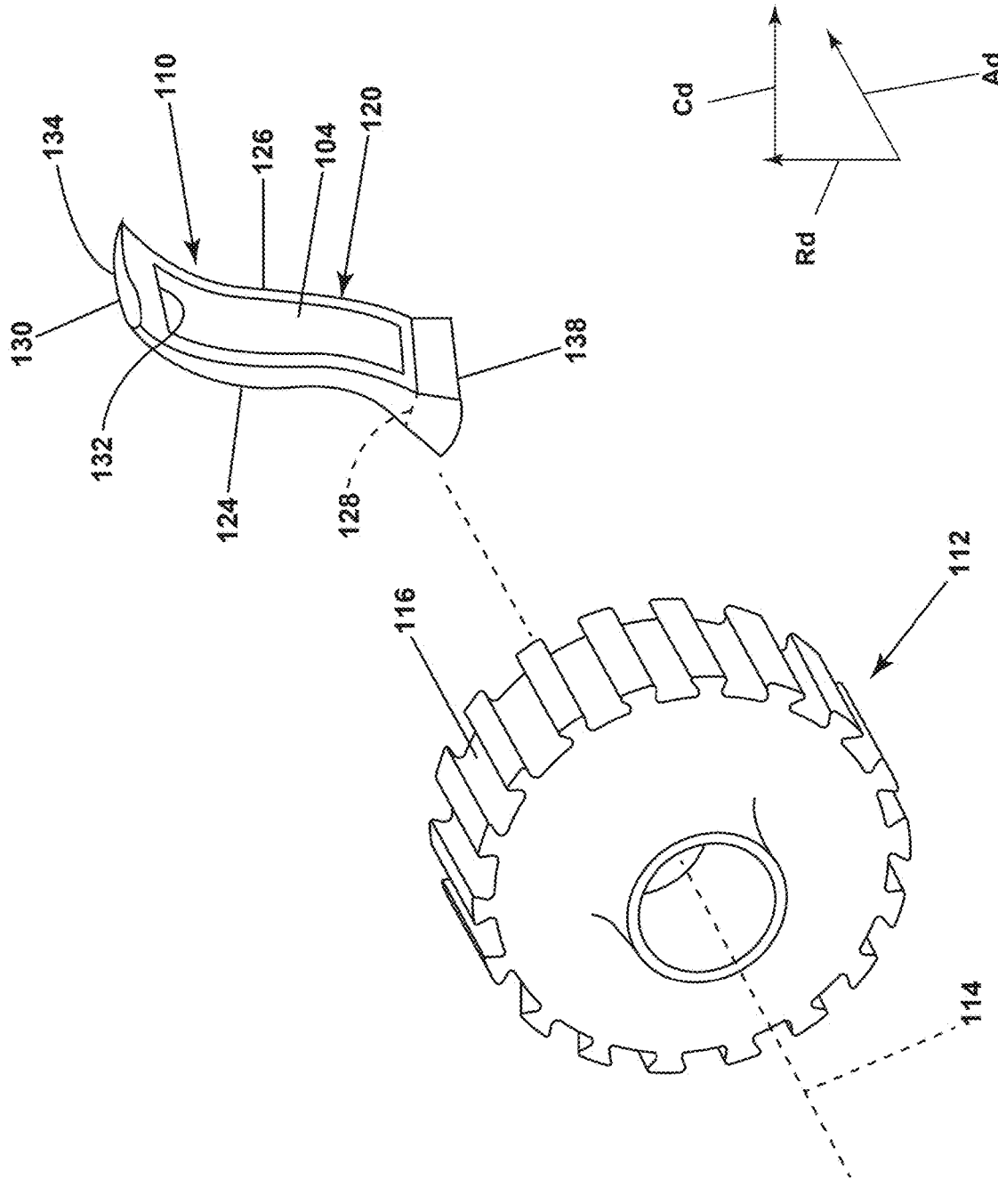
FIG. 3 is a schematic perspective view of a rotor assembly suitable for use within the gas turbine engine of FIG. 1 and FIG. 2, the rotor assembly including a blade and a rotor, in accordance with an exemplary embodiment of the present disclosure.

FIG. 3 is a schematic perspective view of an exemplary rotor assembly 109 including a composite airfoil 110 and a rotor 112 suitable for use within the gas turbine engine 10 of FIGS. 1-2. The rotor 112 is suitable for use as the rotor 43 (FIGS. 1-2), the disk 61, 71 (FIG. 1) or any other rotor or disk such as, but not limited to, any rotor or disk within the fan section 18, the compressor section 22, or the turbine section 32 of the gas turbine engine 10. The rotor assembly 109 is any suitable rotor assembly such as, but not limited to, a disk assembly as illustrated. The composite airfoil 110 can be rotating or non-rotating such that the composite airfoil 110 can include at least one of the set of LP static compressor vanes 60 (FIG. 1), the set of HP static compressor vanes 62 (FIG. 1), the set of LP compressor blades 56 (FIG. 1), the set of HP compressor blades 58 (FIG. 1), the set of HP static turbine vanes 72 (FIG. 1), the set of LP static turbine vanes 74 (FIG. 1), the set of HP turbine blades 68 (FIG. 1), the set of LP turbine blades 70 (FIG. 1), the set of stationary fan vanes 82 (FIG. 1), or the set of fan blades 42 (FIG. 1). As a non-limiting example, the composite airfoil 110 can be a composite fan blade assembly.

The rotor 112 is rotatable about a rotational axis 114. The rotational axis 114 can coincide with or be offset from the engine centerline 12 (FIG. 1). The rotor 112 includes a plurality of slots 116 extending axially through a radially outer portion of the rotor 112 and being circumferentially spaced about the rotor 112, with respect to the rotational axis 114.

The composite airfoil 110 extends between a leading edge 124 and a trailing edge 126, opposite the leading edge 124, to define a chord-wise direction. The composite airfoil 110 extends between a root 128 and a tip 130 to define a span-wise direction. The root 128 is defined as a position where the composite airfoil 110 meets a radially outermost edge of the rotor 112. The composite airfoil 110 includes a pressure side 132 and a suction side 134, opposite the pressure side 132.

The leading edge 124 and the trailing edge 126, extend radially from the root 128 to the tip 130. The pressure side 132 and the suction side 134, opposite the pressure side 132, extend axially between the leading edge 124 and trailing edge 126. A dovetail portion 138 can extend from the composite airfoil 110. The composite airfoil 110 also includes cladding 120.

The composite airfoil 110 is coupled to the rotor 112 by inserting at least a portion of the dovetail portion 138 into a respective slot of the plurality of slots 116. The composite airfoil 110 is held in place by frictional contact with the slot 116 or can be coupled to the slot 116 via any suitable coupling method such as, but not limited to, welding, adhesion, fastening, or the like. While only a single composite airfoil 110 is illustrated, it will be appreciated that there can be any number of composite airfoils 110 coupled to the rotor 112. As a non-limiting example, there can be a plurality of composite airfoils 110 corresponding to a total number of slots of the plurality of slots 116.

For the sake of reference, a set of relative reference directions, along with a coordinate system can be applied to the rotor assembly 109. An axial direction (Ad) can extend from forward to aft and is shown extending at least partially into the page. The axial direction (Ad) and can be arranged parallel to the rotational axis 114. A radial direction (Rd) extends perpendicular to the axial direction (Ad) and can extend perpendicular to the engine centerline 12. A circumferential direction (Cd) can be defined perpendicular to the radial direction (Rd) and can be defined along the circumference of the gas turbine engine 10 (FIG. 1) relative to the engine centerline 12 (FIG. 1).

Figure 4:
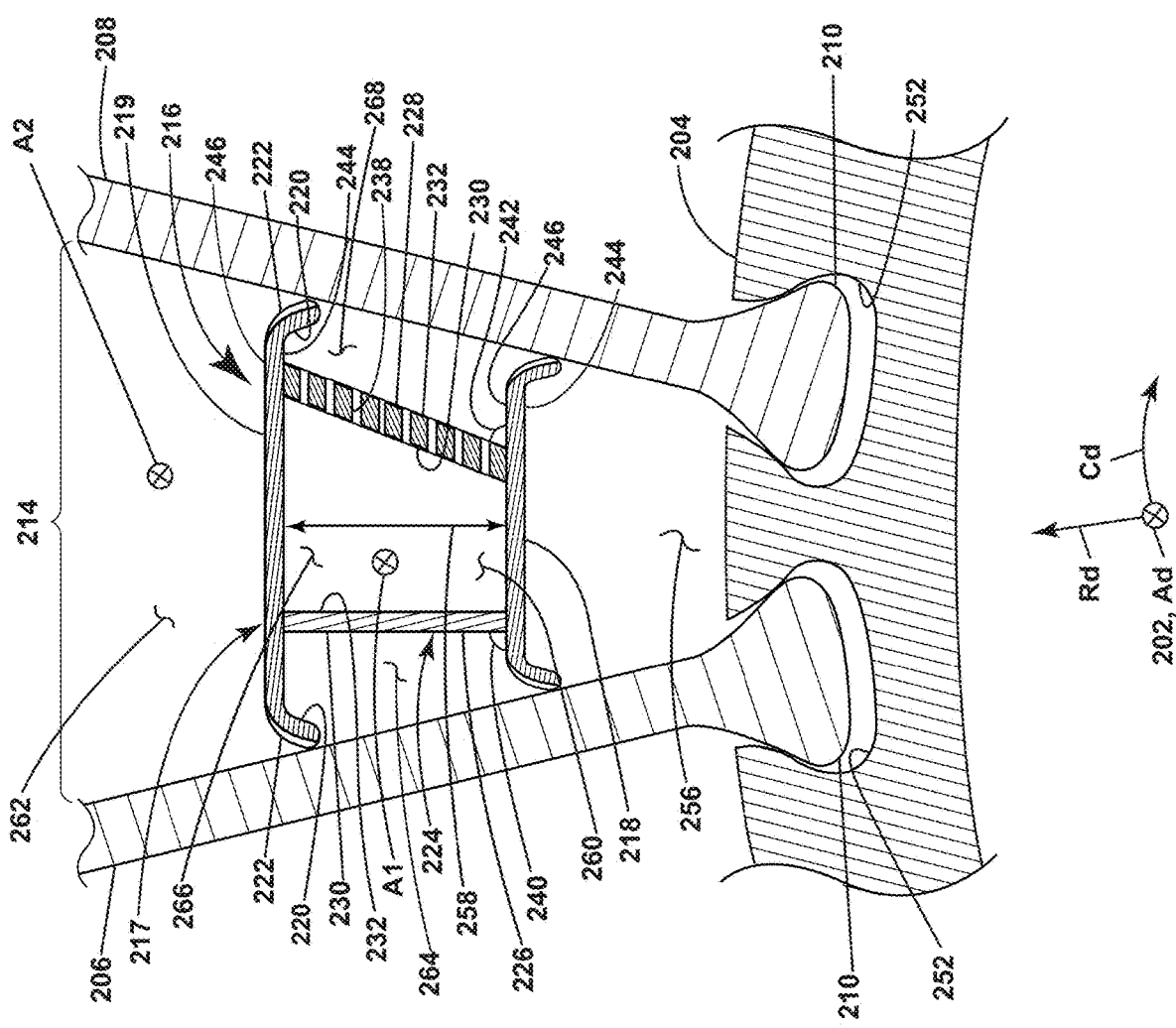
FIG. 4 is a schematic cross-sectional view of a portion of an exemplary rotor assembly suitable for use as any of the rotor assemblies of FIGS. 1-3, further illustrating a flow splitter, in accordance with various embodiments described herein.

FIG. 4 is a schematic perspective view from a forward end looking aft of a portion of a rotor assembly 200 suitable for use as the rotor assembly 41 (FIGS. 1-2) or the rotor or the rotor assembly 109 (FIG. 3). The rotor assembly 200 is similar to the rotor assembly 41 (FIGS. 1-2), 109 (FIG. 3); therefore, like parts will be identified with like names with it being understood that the description of the rotor assembly 41, 109 applies to the rotor assembly 200 unless noted otherwise.

The rotor assembly 200 defines a rotational axis 202. The rotational axis 202 coincides with an axial direction (Ad). A circumferential direction (Cd) and a radial direction (Rd) with respect to the rotational axis 202 are illustrated. It should be understood that all references herein to the axial direction (Ad), circumferential direction (Cd) and radial direction (Rd) are with respect to the rotational axis 202.

The rotor assembly 200 includes a rotor 204. In a non-limiting example, the rotor 204 is a rotor disk. The rotor assembly 200 includes a plurality of blades (e.g. the set of fan blades 42 of FIG. 1, the set of circumferentially spaced fan blades 42 of FIG. 2, or the composite airfoil 110 of FIG. 3). The plurality of blades includes a first blade 206 and a second blade 208. It will be appreciated that the plurality of blades includes any number of two or more blades circumferentially spaced about the rotational axis 202. A root end of the first blade 206 and the second blade 208 includes a respective dovetail 210. The first blade 206 is circumferentially spaced from the second blade 208 to define an intervening gap 214 therebetween.

The rotor assembly 200 includes a flow splitter 216. The flow splitter 216 can be the flow splitter 45 of FIG. 1. The flow splitter 216 is located within the intervening gap 214. Particularly, the flow splitter 216 includes a set of platforms 217 extending circumferentially across the intervening gap 214. The set of platforms 217 can include only a single platform, or a plurality of radially spaced platforms including any number of platforms such as three or more platforms. As a non-limiting example, the set of platforms 217 includes a plurality of radially spaced platforms, namely an inner platform 218 and an outer platform 219. The outer platform 219 is radially spaced outwardly from the inner platform 218. Each platform of the set of platforms 217 defines an inner surface 244 and an outer surface 246. In a non-limiting example, the inner platform 218 is parallel with the outer platform 219. It should be understood that the inner platform 218 and the outer platform 219 need not be parallel. That is, the inner platform 218 and the outer platform 219 can extend non-parallel with each other along the circumferential direction (Cd), the axial direction (Ad), or a combination thereof.

Each platform of the set of platforms 217 includes a pair of wings 220. The pair of wings 220 defines circumferential ends of a respective platform of the set of platforms 217. The pair of wings 220 can be frangible. That is, each wing of the pair of wings 220 is sufficiently thin so as to be made to break in the event of hard impact crush loads between the first blade 206, the second blade 208, and the set of platforms 217 that can occur during ingestion events (e.g. where an object exterior of the gas turbine engine 10 enters the gas turbine engine 10 during operation). The pair of wings 220 have various materials. As non-limiting example, the material of the pair of wings 220 can be the same as a material of the respective platform of the set of platforms 217 that the pair of wings 220 extend from. Alternatively, the pair of wings 220 can have a differing material from the set of platforms 217. As a non-limiting example, the pair of wings 220 can include a material having a lower strain tolerance than a material of a remainder of the respective platform of the set of platforms 217.

Each platform of the set of platforms 217 includes a pair of seal members 222. Each seal member of the pair of seal members 222 is a resilient airtight seal member bonded to a respective one of the pair of wings 220. In a non-limiting example, the pair of seal members 222 can be a soft flexible material such as silicone.

The flow splitter 216 includes a support structure. The support structure includes a set of connecting walls 224. Each connecting wall of the set of connecting walls 224 extends radially, coupling a pair of adjacent platforms of the set of platforms 217. It should be understood that the set of connecting walls 224 can include any number connecting walls including one or a plurality of connecting walls, such as two or more connecting walls. A radial length 258 is measured radially between adjacent platforms of the set of platforms 217. The radial length 258 can be in a range from 0.5% to 10% of a total span length of the first blade 206 and the second blade 208. The aforementioned range can correspond with the radial length 258 being similar to a radial length of the engine core inlet 81 (FIG. 1). By setting the radial length 258 within the aforementioned range and greater than the radial length of the engine core inlet 81 (FIG. 1), a higher volume of airflow is directed into the engine core 44 (FIG. 1) during operation of the gas turbine engine 10 (FIG. 1). Conversely, by setting the radial length 258 within the aforementioned range and less than the radial length of the engine core inlet 81 (FIG. 1), risk of FOD ingestion into the engine core 44 (FIG. 1) is decreased. As a non-limiting example, the radial length 258 corresponds with a distance between the inner surface 244 of the outer platform 219 and the outer surface 246 of the inner platform 218. As a non-limiting example, the set of connecting walls 224 couples the inner platform 218 to the outer platform 219.

The set of connecting walls 224 includes a first connecting wall 226 and a second connecting wall 228 circumferentially spaced from the first connecting wall 226. Each connecting wall of the set of connecting walls 224 is defined by a respective first surface 230 and second surface 232. The first surface 230 is circumferentially opposed to the second surface 232. Each connecting wall of the set of connecting walls 224 can be solid, perforated or a combination thereof. As used herein, the term "solid" refers to a structure in which a fluid cannot travel circumferentially therethrough. As used herein, the term "perforated" refers to a structure in which a fluid can travel circumferentially therethrough. As a non-limiting example, the first connecting wall 226 is solid. As such, a fluid cannot travel circumferentially through the first connecting wall 226 from the first surface 230 of the first connecting wall 226 to the second surface 232 of the first connecting wall 226. As a non-limiting example, the second connecting wall 228 is perforated and includes at least one perforation 238. As such, a fluid can travel circumferentially through the second connecting wall 228 from the first surface 230 of the second connecting wall 228 to the second surface 232 of the second connecting wall 228. A cross-sectional shape of the at least one perforation 238 can include a circle, an oval, a rectangle, a triangle, a semi-circle, or a combination thereof.

Each connecting wall of the set of connecting walls 224 forms an angle with a respective platform of the set of platforms 217 from which the respective connecting wall extends. Each connecting wall of the set of connecting walls 224 can be perpendicular to a platform of the set of platforms 217. As used herein, perpendicular refers to an angle from 80° to 100°. As a non-limiting example, a first angle 240 is defined between the first connecting wall 226 and the inner platform 218. A second angle 242 is defined between the second connecting wall 228 and the inner platform 218. The first angle 240 and the second angle 242 can each have a value from 80° to 100°. If the first angle 240, the second angle 242, or a combination thereof have a value falling outside of the aforementioned range, significant stress will be exerted on the first connecting wall 226, the second connecting wall 228, or a combination thereof by centripetal force as the rotor 204 rotates during operation. In the illustrated non-limiting example, the first angle 240 is about 90°. As used herein, about 90° refers to an angle from 85° to 95°. By orienting the first connecting wall 226 such that it falls within the aforementioned range, the first connecting wall 226 extends radially, which minimizes an amount of stress exerted on the first connecting wall 226 by centripetal force as the rotor 204 rotates during operation. The first angle 240 can be the same as the second angle 242. Alternatively, the first angle 240 can be different from the second angle 242. As the set of platforms 217 can include any number of platforms and the set of connecting walls 224 can include any number of connecting walls, it should be understood that the aforementioned angle range applies to an angle formed by each connecting wall of the set of connecting walls 224 and a corresponding platform of the set of platforms 217 from which the connecting wall extends.

The flow splitter 216 comprises a composite material. In a non-limiting example, the composite material comprises graphite fibers and an epoxy resin. The set of platforms 217 and the set of connecting walls 224 can be integrally formed. That is, each of the inner platform 218, the outer platform 219, and the first connecting walls 226, and the second connecting wall 228 can comprise the same composite material and form a unitary body. Alternatively, the set of connecting walls 224 can be separately formed from the set of platforms 217. In a non-limiting example, the set of connecting walls 224 can be formed from a composite material. Each connecting wall of the set of connecting walls 224 can be formed from the same composite material, or some connecting walls of the set of connecting walls 224 can be formed from a material having a first composition, and other connecting walls of the set of connecting walls 224 can be formed from a material having a second composition different from the first composition. As used herein, the term "composition" refers to the specific combination and proportions of different materials within a product or substance. That is, if two compositions are different, then one composition has different materials, different proportions of the same material, different proportions of different materials, or any combination thereof.

The rotor 204 receives a portion of the first blade 206 and a portion of the second blade 208. Particularly, the dovetail 210 of the first blade 206 and the dovetail 210 of the second blade 208 are each received within a respective slot 252 on the rotor 204.

In a non-limiting example, the rotor assembly 200 can be located in the fan section 18 of the gas turbine engine 10 of FIG. 1. As a non-limiting example, the rotor assembly 200 can be located within the fan section 18 (FIG. 1) such that the first blade 206 and the second blade 208 are included in the plurality of fan blades 42 (FIGS. 1-2).

The flow splitter 216 partially defines a cavity 256. Illustrated by way of non-limiting example, the cavity 256 is defined by the inner platform 218, the first blade 206, the second blade 208, and the rotor 204. The cavity 256 is not in fluid communication with the engine core 44 (FIG. 1). That is, the cavity 256 contains dead air configured to stagnate in the cavity 256 and not flow to the engine core 44 (FIG. 1).

The flow splitter 216 defines a plurality of airflow passages through which an airflow (e.g. the inlet airflow 78 of FIG. 1) is configured to pass. A working airflow passage 260 and an exterior airflow passage 262 are at least partially defined by respective portions of the flow splitter 216.

The working airflow passage 260 is fluidly coupled to the engine core 44. The working airflow passage 260 is defined as an airflow passage through which a majority of the freestream airflow 80 (FIG. 1) flows and subsequently exhausts into the engine core 44 (FIG. 1). At least a portion of the freestream airflow 80 (FIG. 1) that flows through the working airflow passage 260 can subsequently exhaust to a portion of the gas turbine engine 10 outside the engine core 44 (FIG. 1) but outside the housing 40 (FIG. 1). The working airflow passage 260 is defined by the outer surface 246 of the inner platform 218, the first blade 206, the second blade 208, and the inner surface 244 of the outer platform 219. A ratio of a cross-sectional area of the working airflow passage 260 to a cross-sectional area of the cavity 256 is in a range from 3.0 to 0.2. The aforementioned ratio provides for a balance between improved core inlet airflow and improved FOD rejection.

The working airflow passage 260 can be divided into a plurality of channels by the set of connecting walls 224. That is, each pair of circumferentially adjacent channels is separated by a respective connecting wall of the set of connecting walls 224. Illustrated by way of non-limiting example, the working airflow passage 260 is divided into a first channel 264, a second channel 266, and a third channel 268 by the first connecting wall 226 and the second connecting wall 228. The first channel 264 and the second channel 266 are fluidly separated from one another by the first connecting wall 226. The second channel 266 and the third channel 268 are partially physically separated from one another by the second connecting wall 228 but are fluidly coupled to each other by the at least one perforation 238 within the second connecting wall 228.

The exterior airflow passage 262 is fluidly coupled with at least a portion of the gas turbine engine 10 outside the housing 40 and outside the engine core 44 (FIG. 1). Particularly, the exterior airflow passage 262 directs at least a portion of the freestream airflow 80 (FIG. 1) along an exterior portion of the gas turbine engine 10 (e.g., an exterior of the housing 40 of FIG. 1). The exterior airflow passage 262 is defined by the outer surface 246 of the outer platform 219, the first blade 206, and the second blade 208.

The working airflow passage 260 is located radially inward from the exterior airflow passage 262. The working airflow passage 260 can define a radially innermost airflow passage of the rotor assembly 200. The exterior airflow passage 262 can define a radially outermost flow passage of the rotor assembly 200. Both the working airflow passage 260 and the exterior airflow passage 262 are located radially outward from the cavity 256.

During operation of the rotor assembly 200, an inlet airflow (e.g. inlet airflow 78 of FIG. 1) is generated by rotation of the rotor assembly 200. The inlet airflow is split between the working airflow passage 260 and the exterior airflow passage 262 to define a working airflow (A1) and an exterior airflow (A2). The working airflow (A1) flows into the housing 40 (FIG. 1) where it is used as a working airflow (e.g., the working airflow 76 of FIG. 1). The exterior airflow (A2) flows along an exterior portion of the gas turbine engine 10 that is exterior the engine core 44 (FIG. 1) (e.g., the exterior airflow 79 of FIG. 1). The working airflow (A1) is considered a radially inner airflow and the exterior airflow (A2) is considered a radially outer airflow.

In some examples where the pair of wings 220 are each frangible, if the first blade 206, the second blade 208, or a combination thereof is struck by FOD during operation, the respective wing of the pair of wings 220 will break off, allowing the respective first blade 206, the second blade 208, or combination thereof to rotate throughout its rotation capability. The pair of wings 220 are designed to break off while a remainder of the flow splitter 216 is designed to remain intact. Thus, very little of the mass of the flow splitter 216 is lost when the pair of wings 220 break off. As such, the functionality of the flow splitter 216 (e.g., the directing of the airflow through the working airflow passage 260 and the exterior airflow passage 262) is minimally affected.

Figure 5:
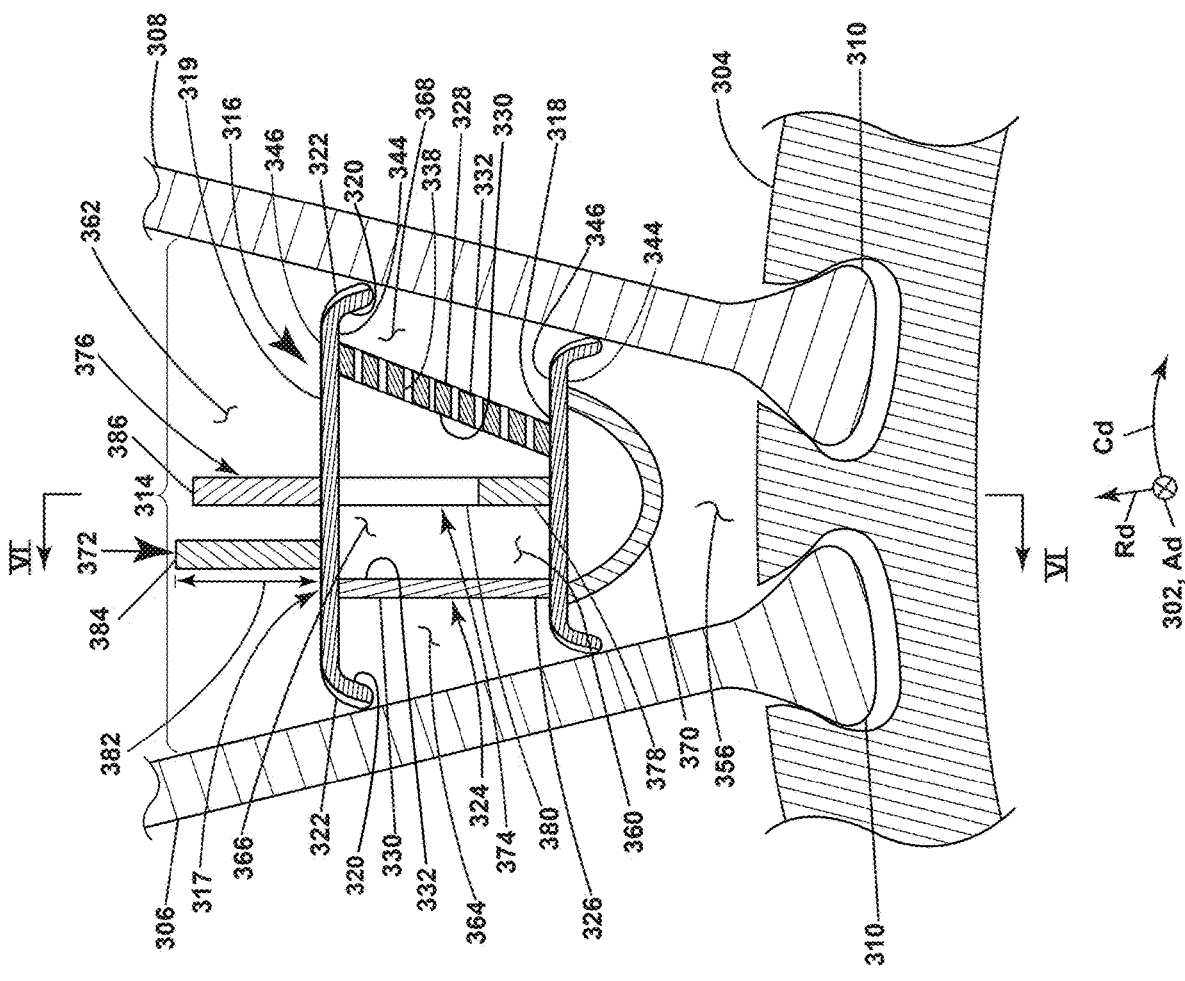
FIG. 5 is a schematic cross-sectional view of a portion of an exemplary rotor assembly suitable for use as any of the rotor assemblies of FIGS. 1-3, further illustrating a flow splitter including a set of splitter vanes, in accordance with embodiments of the present disclosure.

FIG. 5 is a schematic perspective view from a forward end looking aft of a portion of an exemplary rotor assembly 300 suitable for use as the rotor assembly 41 (FIGS. 1-2) or the rotor assembly 109 (FIG. 3). The rotor assembly 300 is similar to the rotor assembly 200 (FIG. 4), therefore, like parts will be identified with like numerals increased to the 300 series with it being understood that the description of the rotor assembly 200 applies to rotor assembly 300 unless noted otherwise. The rotor assembly 300 differs from the rotor assembly 200 (FIG. 4) in that the rotor assembly 300 includes additional features compared to the rotor assembly 200 (FIG. 4).

The rotor assembly 300 defines a rotational axis 302. The rotor assembly 300 includes a rotor 304. The rotor assembly 300 includes a first blade 306, and a second blade 308 each including a respective dovetail 310. The first blade 306 is circumferentially spaced from the second blade 308 to define an intervening gap 314. The rotor assembly 300 includes a flow splitter 316. The flow splitter 316 includes a set of platforms 317. The set of platforms 317 includes an inner platform 318 and an outer platform 319, the outer platform 319 being radially spaced from the inner platform 318. Each platform of the set of platforms 317 defines an inner surface 344 and an outer surface 346. Each platform of the set of platforms 317 includes a pair of wings 320 and pair of seal members 322, with each seal member of the pair of seal members 322 attached to a respective wing of the pair of wings 320. The flow splitter 316 also includes a support structure including a set of connecting walls 324. The set of connecting walls 324 includes a first connecting wall 326 that is solid and a second connecting wall 328 that is perforated (including at least one perforation 338). Each connecting wall of the set of connecting walls 324 is defined by a first surface 330 circumferentially opposed to a second surface 332.

In a non-limiting example, the rotor assembly 300 can be located in the fan section 18 of the gas turbine engine 10 of FIG. 1. As a non-limiting example, the rotor assembly 300 can be located within the fan section 18 (FIG. 1) such that the first blade 306 and the second blade 308 are included in the plurality of fan blades 42 (FIGS. 1-2).

The flow splitter 316 partially defines a cavity 356, a working airflow passage 360, and an exterior airflow passage 362. The working airflow passage 360 is divided into a plurality of channels by the set of connecting walls 324, namely by the first connecting wall 326 and the second connecting wall 328. Illustrated by way of non-limiting example, the working airflow passage 360 is divided into a first channel 364, a second channel 366, and a third channel 368 by the first connecting wall 326 and the second connecting wall 328.

The flow splitter 316 can include a structural body 370. The structural body 370 extends radially inward from a radially innermost surface of a radially innermost platform of the set of platforms 217. The structural body 370 strengthens the flow splitter 316 without hindering the function of the flow splitter 316, namely defining the working airflow passage 360 separate from the exterior airflow passage 362, since the structural body 370 extends into the cavity 356 containing dead air. As a non-limiting example, the structural body 370 extends radially inward from the inner surface 344 of the inner platform 318 into the cavity 356.

The flow splitter 316 can include a set of splitter vanes 372 each extending radially from at least one platform of the set of platforms 317 between the first blade 306 and the second blade 308. The set of splitter vanes 372 can include a subset of splitter vanes each extending from a respective platform of the set of platforms 317. As a non-limiting example, the set of splitter vanes 372 includes a subset of inner splitter vanes 374 extending radially outward from the outer surface 346 of the inner platform 318 and a subset of outer splitter vanes 376 extending radially outward from the outer surface 346 of the outer platform 319. Particularly, the subset of inner splitter vanes 374 can be located between one or more of the first blade 306 or the second blade 308 and a connecting wall of the set of connecting walls 324, or two circumferentially opposed connecting walls of the set of connecting walls 324. The first blade 306 and the second blade 308 each extend radially further than the subset of outer splitter vanes 376. It should be understood that the set of splitter vanes 372 can include other subsets of splitter vanes, such as a subset of splitter vanes extending radially inward from the inner surface 344 of the outer platform 319.

The set of splitter vanes 372 can include a plurality of splitter vanes. Particularly, the subset of inner splitter vanes 374, the subset of outer splitter vanes 376, or a combination thereof can each include a plurality of splitter vanes, such as two or more splitter vanes, or three or more splitter vanes. The plurality of splitter vanes can be radially spaced from one another. That is, the set of splitter vanes 372 can include splitter vanes that each extend from multiple radially spaced platforms of the set of platforms 317. As a non-limiting example, the subset of inner splitter vanes 374 is radially spaced from the subset of outer splitter vanes 376. Additionally or alternatively, the plurality of splitter vanes can be axially spaced from one another. As a non-limiting example, the subset of inner splitter vanes 374 includes a forward inner splitter vane 378 (illustrated with cross-hatching) that is axially spaced from an aft inner splitter vane 380 (illustrated without any cross-hatching). Additionally or alternatively still, the plurality of splitter vanes can be circumferentially spaced from one another. As a non-limiting example, the subset of outer splitter vanes 376 includes a first outer splitter vane 384 and a second outer splitter vane 386 located circumferentially clockwise from the first outer splitter vane 384.

The flow splitter 316 can be integrally formed with the set of splitter vanes 372 and the structural body 370. That is, the set of platforms 317, the set of connecting walls 324, the set of splitter vanes 372, and the structural body 370 can be integrally formed. Alternatively, the set of splitter vanes 372 can be formed separately from the rest of the flow splitter 316. That is, the set of splitter vanes 372 can consist of a first material composition and other portions of the flow splitter 316, such as the set of connecting walls 324, can consist of a second material composition that is different from the first material composition. In a non-limiting example, the set of splitter vanes 372 can be formed of a composite material.

Figure 6:
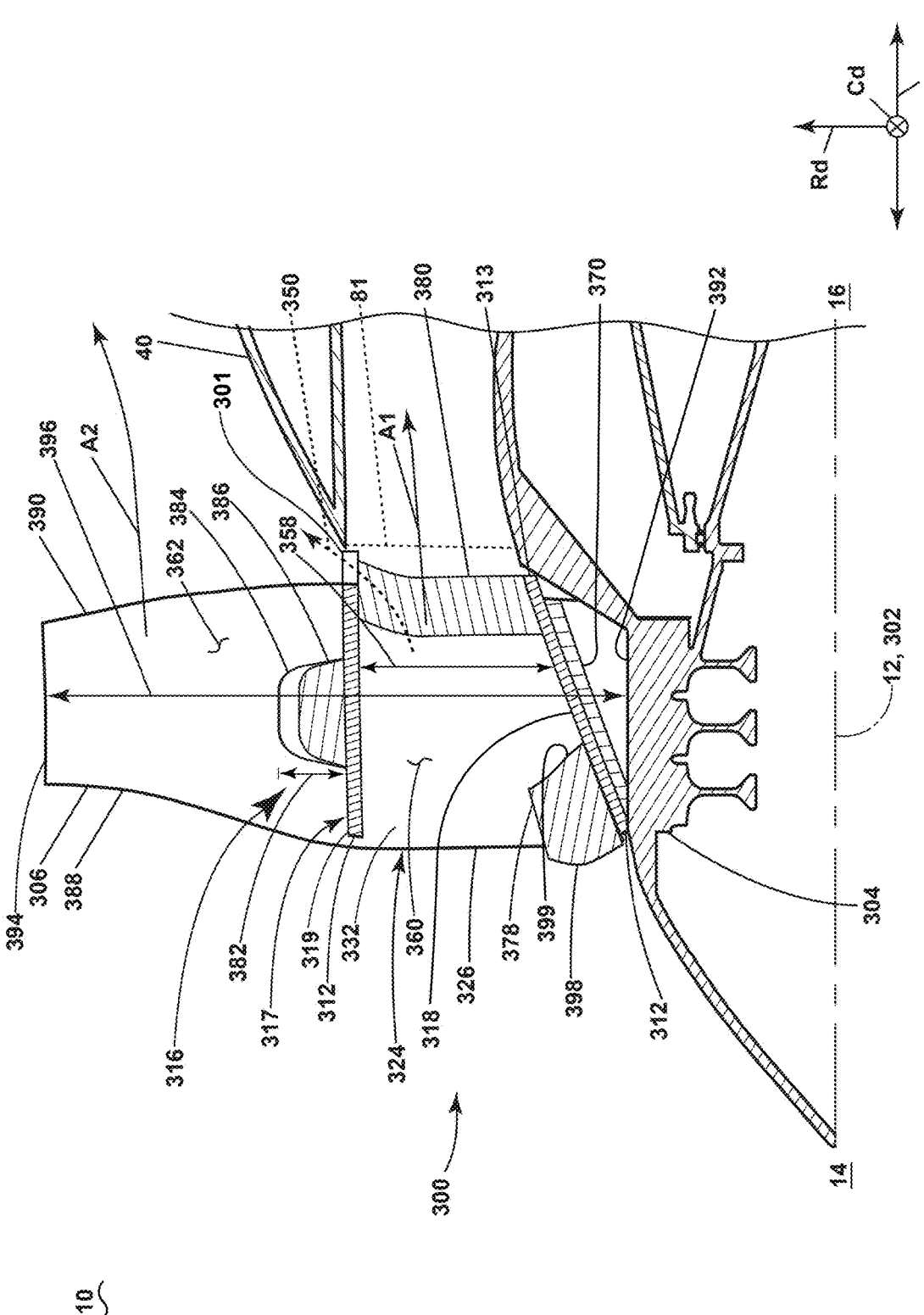
FIG. 6 is a schematic cross-sectional view of the rotor assembly of FIG. 5, further illustrating the rotor assembly located within a gas turbine engine, in accordance with various embodiments described herein.

FIG. 6 depicts a cross-sectional view of a portion of the gas turbine engine 10 (FIGS. 1-2) including the rotor assembly 300 (FIG. 5) taken along sectional line VI-VI in FIG. 5. The axial direction (Ad) extends from the forward end 14 to the aft end 16 and is shown extending horizontally across the page. The axial direction (Ad) is parallel to the engine centerline 12, the engine centerline 12 corresponding with the rotational axis 302. The radial direction (Rd) extends perpendicularly to the axial direction (Ad) and is shown vertically across the page. The circumferential direction (Cd) extends perpendicular to the radial direction (Rd) and is shown extending into the page.

The rotor assembly 300 includes the first blade 306 coupled to the rotor 304. The first blade 306 and the second blade 308 (FIG. 5) each extend axially between a leading edge 388 and a trailing edge 390, the trailing edge 390 being axially opposed to the leading edge 388. The first blade 306 and the second blade 308 (FIG. 5) each extend radially between a root 392 and a tip 394 to define a blade radial length 396.

The rotor assembly 300 further includes the flow splitter 316. The flow splitter 316 includes the set of platforms 317.

The set of platforms 317 includes an inner platform 318 and an outer platform 319 radially spaced from the inner platform 318 by a radial length 358. Each platform of the set of platforms 317 extends between a leading edge 312 and a trailing edge 313. The leading edge 312 of each platform of the set of platforms 317 can extend axially forward of the leading edge 388 of the first blade 306, the leading edge 388 of the second blade 308 (FIG. 5), or a combination thereof. Illustrated by way of non-limiting example, the leading edge 312 of the outer platform 319 extends axially forward of the leading edge 388 of the first blade 306. Additionally or alternatively, the trailing edge 313 of each platform of the set of platforms 317 can extend axially aft of the trailing edge 390 of the first blade 306, the trailing edge 390 of the second blade 308 (FIG. 5), or a combination thereof. As illustrated by way of non-limiting example, the trailing edge 313 of the inner platform 318 extends axially aft of the trailing edge 390 of the first blade 306.

The flow splitter 316 also includes a support structure including the set of connecting walls 324. The second surface 332 of the first connecting wall 326 is visible in FIG. 6. The flow splitter 316 can include the structural body 370.

The flow splitter 316 can include the set of splitter vanes 372. A cross-section of each splitter vane of the set of splitter vanes 372 is in a shape of an airfoil (e.g. the forward inner splitter vane 378 and the aft inner splitter vane 380), a rectangle, a triangle, a semicircle, an elongated semicircle (e.g. the first outer splitter vane 384 and the second outer splitter vane 386), or any combination thereof. Each splitter vane of the set of splitter vanes 372 defines a respective vane radial length 382. The vane radial length 382 of each splitter vane of the set of splitter vanes 372 can be in a range from 0.2% to 3% of the blade radial length 396. By setting the vane radial length 382 within the aforementioned range, each splitter vane of the set of splitter vanes 372 can be made to be smaller and sturdier than the first blade 306 and the second blade 308 (FIG. 5). The set of splitter vanes 372 can accordingly slice into FOD to minimize damage from the FOD downstream of the flow splitter 316, while also increasing airflow into the engine core inlet 81 during operation of the gas turbine engine 10. The vane radial length 382 of the subset of inner splitter vanes 374 can be in a range from 10% to 100% of the radial length 358 between the inner platform 318 and the outer platform 319. By setting the vane radial length 382 of the subset of inner splitter vanes 374 at a lower end of the aforementioned range, the subset of inner splitter vanes 374 have a low probability of fracturing when impacted by FOD such as a bird. By setting the vane radial length 382 of the subset of inner splitter vanes 374 at a higher end of the aforementioned range, the subset of inner splitter vanes 374 would need to be thicker or heavier but would have additional benefits of airflow and compression factor near the root 392. By setting the vane radial length 382 within the aforementioned range, a balance between probability of fracturing as a result of FOD impact and improved airflow and compression near the root 392 is achieved. The set of splitter vanes 372 can include a plurality of splitter vanes each having the same vane radial length 382, or different vane radial lengths 382. As illustrated by way of non-limiting example, the forward inner splitter vane 378 has a vane radial length 382 that is less than a vane radial length 382 of the aft inner splitter vane 380.

An inner splitter vane of the subset of inner splitter vanes 374 can have a vane radial length 382 that is the same as the radial length 358 between the inner platform 318 and the outer platform 319. That is, inner splitter vane of the subset of inner splitter vanes 374 can extend from more than one platform of the set of platforms 317 simultaneously. Such a splitter vane can additionally or alternatively be considered a part of the set of connecting walls 324. For example, a splitter vane of the set of splitter vanes 372 extending between and coupled to the inner platform 318 and the outer platform 319 can be considered a part of the set of connecting walls 324. Illustrated by way of non-limiting example, the aft inner splitter vane 380 has a vane radial length 382 that is the same as the radial length 358 and can accordingly be considered both part of the set of splitter vanes 372 and the set of connecting walls 324.

The set of splitter vanes 372 can be axially overlapping or offset from the first blade 306, the second blade 308 (FIG. 5), the set of platforms 317, or a combination thereof. That is, at least one splitter vane of the set of splitter vanes 372 can extend axially forward, aft, or a combination thereof from the first blade 306, the second blade 308 (FIG. 5), at least one platform of the set of platforms 317, or a combination thereof.

Each splitter vane of the set of splitter vanes 372 includes a leading edge 398 and a trailing edge 399. The leading edge 398 of at least one splitter vane of the set of splitter vanes 372 can extend axially forward of the leading edge 388 of at least one of the first blade 306 or the second blade 308 (FIG. 5). As a non-limiting example, the leading edge 398 of the forward inner splitter vane 378 extends axially forward of the leading edge 388 of the first blade 306. Additionally or alternatively, the leading edge 398 of at least one splitter vane of the set of splitter vanes 372 can extend axially forward of the leading edge 312 of the platform of the set of platforms 317 from which the at least one splitter vane extends. As a non-limiting example, the leading edge 398 of the forward inner splitter vane 378 extends axially forward of the leading edge 312 of the inner platform 318.

The trailing edge 399 of at least one splitter vane of the set of splitter vanes 372 can extend axially aft of the trailing edge 390 of at least one of the first blade 306 or the second blade 308 (FIG. 5). As a non-limiting example, the trailing edge 399 of the aft inner splitter vane 380 extends axially aft of the trailing edge 390 of the first blade 306. Additionally or alternatively, the trailing edge 399 of at least one splitter vane of the set of splitter vanes 372 can extend axially aft of the trailing edge 313 of the platform of the set of platforms 317 from which the at least one splitter vane extends. As a non-limiting example, the trailing edge 313 of aft inner splitter vane 380 extends axially aft of the trailing edge 313 of the inner platform 318 and the trailing edge 313 of the outer platform 319.

The gas turbine engine 10 can include an optional airflow 350 illustrated as a dotted line. The optional airflow 350 is at least a portion of the airflow flowing through the working airflow passage 360 that merges with the airflow flowing through the exterior airflow passage 362 downstream of the flow splitter 316. That is, a portion of the airflow flowing through the working airflow passage 360 can ultimately become part of the exterior airflow (A2). In a non-limiting example, the optional airflow 350 can account for a percentage in a range from 1% to 10% of a volume of airflow flowing through the working airflow passage 360. By allowing for the optional airflow 350 to flow through the working airflow passage 360 and become part of the exterior airflow (A2), FOD can be ejected without flowing into the engine core inlet 81 and causing damage to the engine core 44 or other components within the housing 40.

The gas turbine engine 10 can include a seal 301 between an outer casing of the engine core 44 (FIG. 1) (e.g. the housing 40) and the outer platform 319. The seal 301 can be a labyrinth seal such that the outer platform 319 is not physically coupled with the housing 40, but air flowing through the working airflow passage 360 is prevented from joining air flowing through the exterior airflow passage 362. That is, the outer platform 319 is fluidly coupled to at least a portion of the engine core inlet 81 by the seal 301. By including the seal 301, the optional airflow 350 is minimized or eliminated.

Figure 7:
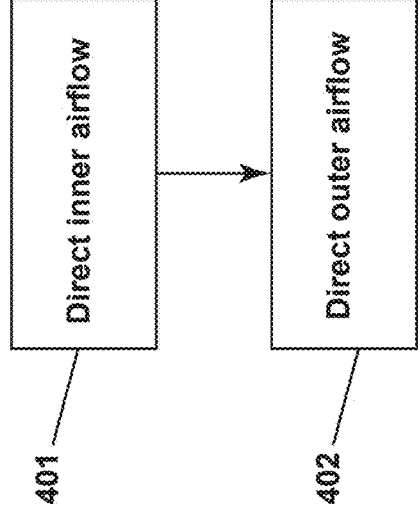
FIG. 7 is a flowchart illustrating a method of operating a gas turbine engine (e.g. the gas turbine engine of FIGS. 1-2) in accordance with various embodiments described herein.

FIG. 7 is a flowchart illustrating a method 400 of operating a gas turbine engine (e.g. the gas turbine engine 10 of FIGS. 1-2, and 6) in accordance with various embodiments described herein. At block 401, the method 400 includes directing an inner air flow (e.g. the working airflow (A1) of FIGS. 4-6) through a working airflow passage (e.g. the working airflow passage 260 of FIG. 4 or the working airflow passage 360 of FIGS. 5-6) at least to an engine core (e.g. engine core 44 of FIG. 1). At block 402, the method 400 includes directing an outer air flow (e.g. the exterior airflow (A2) of FIGS. 4-6) through an exterior airflow passage (e.g. the exterior airflow passage 262 of FIG. 4 or the exterior airflow passage 362 of FIGS. 5-6) to a portion of the gas turbine engine outside the engine core.

While described with respect to an unducted gas turbine engine, it should be appreciated that the rotor assemblies as described herein can be for any engine, including a ducted gas turbine engine having a nacelle or other additional casing or housing that surrounds at least a portion of the fan section of the gas turbine engine. To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe embodiments of the disclosure described herein, including the best mode, and also to enable any person skilled in the art to practice embodiments of the disclosure, including making and using any devices or systems and performing any incorporated methods. The patentable scope of embodiments of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further embodiments are provided by the subject matter of the following clauses:

A gas turbine engine comprising a fan section, a compressor section, a combustion section, and a turbine section in serial flow arrangement, with the compressor section, the combustion section, and the turbine section defining an engine core, wherein the fan section includes a rotor assembly defining a rotational axis, the rotor assembly comprising a first blade and a second blade circumferentially spaced about the rotational axis to define an intervening gap, a rotor receiving a portion of the first blade and a portion of the second blade, and a flow splitter located within the intervening gap, wherein the flow splitter defines at least a portion of a working airflow passage fluidly coupled to the engine core, and wherein the flow splitter defines at least a portion of an exterior airflow passage that is fluidly coupled with at least a portion of the gas turbine engine downstream of the rotor assembly and outside the engine core.

The gas turbine engine of any preceding clause, wherein the flow splitter comprises an inner platform and an outer platform, radially spaced outwardly from the inner platform.

The gas turbine engine of any preceding clause, wherein the flow splitter further includes a plurality of platforms including at least three or more radially spaced platforms.

The gas turbine engine of any preceding clause, wherein the working airflow passage is defined by the inner platform, the first blade, the second blade, and the outer platform.

The gas turbine engine of any preceding clause, wherein the working airflow passage defines a radially innermost airflow passage of the rotor assembly with respect to the rotational axis.

The gas turbine engine of any preceding clause, wherein the rotor assembly further comprises a cavity defined by the inner platform, the first blade, the second blade, and the rotor.

The gas turbine engine of any preceding clause, wherein the working airflow passage is located radially outward from the cavity with respect to the rotational axis.

The gas turbine engine of any preceding clause, wherein a ratio of a cross-sectional area of the working airflow passage to a cross-sectional area of the cavity is in a range from 3.0 to 0.2.

The gas turbine engine of any preceding clause, wherein the cavity is not in fluid communication with the engine core.

The gas turbine engine of any preceding clause, wherein the cavity contains dead air configured to stagnate in the cavity and not flow to the engine core.

The gas turbine engine of any preceding clause wherein a structural body extends radially inward with respect to the rotational axis from the inner platform into the cavity.

The gas turbine engine of any preceding clause, wherein the exterior airflow passage is defined by the outer platform, the first blade, and the second blade.

The gas turbine engine of any preceding clause, wherein the exterior airflow passage is at least partially defined by a radially outermost flow passage with respect to the rotational axis.

The gas turbine engine of any preceding clause, wherein the flow splitter further comprises a support structure extending between the inner platform and the outer platform.

The gas turbine engine of any preceding clause, wherein the support structure comprises a set of connecting walls each extending radially and coupling the inner platform to the outer platform.

The gas turbine engine of any preceding clause, wherein the set of connecting walls includes at least two connecting walls.

The gas turbine engine of any preceding clause, wherein the at least two connecting walls are circumferentially spaced from each other with respect to the rotational axis.

The gas turbine engine of any preceding clause, wherein the working airflow passage is divided into a first channel and a second channel by a first connecting wall of the set of connecting walls.

The gas turbine engine of any preceding clause, wherein the first channel and the second channel are fluidly separated from each other by the first connecting wall.

The gas turbine engine of any preceding clause, wherein the working airflow passage is divided into a second channel and a third channel by a second connecting wall of the set of connecting walls.

The gas turbine engine of any preceding clause, wherein the second connecting wall is defined by a first surface circumferentially opposed to a second surface.

The gas turbine engine of any preceding clause, wherein the second connecting wall is perforated, including at least one perforation.

The gas turbine engine of any preceding clause, wherein the at least one perforation has a cross-section in the shape of a circle, an oval, a rectangle, a triangle, a semi-circle, or a combination thereof.

The gas turbine engine of any preceding clause, wherein the second channel is fluidly coupled to the third channel by at least one perforation extending from the first surface to the second surface of the second connecting wall.

The gas turbine engine of any preceding clause, wherein the set of connecting walls includes at least three connecting walls.

The gas turbine engine of any preceding clause, wherein the at least three connecting walls are circumferentially spaced from each other.

The gas turbine engine of any preceding clause, wherein the working airflow passage is divided into a plurality of channels with each pair of circumferentially adjacent channels of the plurality of channels being separated by a respective connecting wall of the set of connecting walls.

The gas turbine engine of any preceding clause, wherein the set of connecting walls comprises a composite material.

The gas turbine engine of any preceding clause, wherein an intersection between a connecting wall of the set of connecting walls and the inner platform forms an angle in a range from 80° to 100°.

The gas turbine engine of any preceding clause, wherein the set of connecting walls includes at least a first connecting wall forming a first angle and a second connecting wall forming a second angle, the first angle being different from the second angle.

The gas turbine engine of any preceding clause, wherein the set of connecting walls includes at least a first connecting wall forming a first angle and a second connecting wall forming a second angle, the first angle being the same as the second angle.

The gas turbine engine of any preceding clause, wherein the flow splitter includes any number of platforms and the set of connecting walls includes any number of connecting walls, with each connecting wall of the set of connecting walls forming a respective angle with a platform from which the connecting wall extends that is within a range from 80° to 100°.

The gas turbine engine of any preceding clause, wherein a connecting wall of the set of connecting walls is also a splitter vane.

The gas turbine engine of any preceding clause, wherein the inner platform, the outer platform, and the support structure are integrally formed.

The gas turbine engine of any preceding clause, wherein the inner platform and the outer platform each include a pair of wings having a different composition than the respective platform.

The gas turbine engine of any preceding clause, wherein each of the pair of wings is a frangible wing.

The gas turbine engine of any preceding clause, wherein the flow splitter further comprises a seal member attached to each of the frangible wings.

The gas turbine engine of any preceding clause, wherein one of the pair of seal members is attached to the first blade, and the other of the pair of seal members is attached to the second blade.

The gas turbine engine of any preceding clause, wherein the seal member is a flexible material.

The gas turbine engine of any preceding clause, wherein the seal member comprises silicone.

The gas turbine engine of any preceding clause, wherein at least one of the inner platform or the outer platform comprises a set of splitter vanes extending radially outwardly with respect to the rotational axis from the at least one of the inner platform or the outer platform.

The gas turbine engine of any preceding clause, wherein a radial length of each splitter vane of the set of inner splitter vanes is in a range from 10% to 100% of a radial length between the inner platform and the outer platform.

The gas turbine engine of any preceding clause, wherein a leading edge of a splitter vane of the set of inner splitter vanes is axially forward of a leading edge of at least one of the first blade or the second blade.

The gas turbine engine of any preceding clause, wherein a splitter vane of the set of splitter vanes extends axially forward of a leading edge of the at least one of the inner platform or the outer platform.

The gas turbine engine of any preceding clause, wherein a trailing edge of a splitter vane of the set of splitter vanes extends axially aft with respect to the rotational axis of a trailing edge of either of the first blade or the second blade.

The gas turbine engine of any preceding clause, wherein a splitter vane of the set of splitter vanes extends axially aft of a trailing edge of the at least one of the inner platform or the outer platform.

The gas turbine engine of any preceding clause, wherein the set of splitter vanes comprises a composite material.

The gas turbine engine of any preceding clause, wherein a cross-section of each splitter vane of the set of splitter vanes is in a shape of an airfoil, a rectangle, a triangle, a semicircle, an elongated semicircle, or any combination thereof.

The gas turbine engine of any preceding clause, wherein the set of splitter vanes includes at least two splitter vanes that are at least one of radially, axially or circumferentially spaced from each other with respect to the rotational axis.

The gas turbine engine of any preceding clause, wherein the at least two splitter vanes includes at least a first splitter vane and a second splitter vane, and wherein a radial length of the first splitter vane is less than a radial length of the second splitter vane.

The gas turbine engine of any preceding clause, wherein the set of splitter vanes is located between one or more of a blade and a connecting wall of the set of connecting walls and two circumferentially opposed connecting walls of the set of connecting walls.

The gas turbine engine of any preceding clause, wherein the set of inner splitter vanes includes at least three inner splitter vanes.

The gas turbine engine of any preceding clause, wherein a leading edge of at least one of the first blade or the second blade extends axially forward of a leading edge of at least one of the inner platform or the outer platform.

The gas turbine engine of any preceding clause, wherein a leading edge of at least one of the inner platform or the outer platform extends axially forward of a leading edge of at least one of the first blade or the second blade.

The gas turbine engine of any preceding clause, wherein a trailing edge of at least one of the inner platform or the outer platform extends axially aft of a trailing edge of at least one of the first blade or the second blade.

The gas turbine engine of any preceding clause, wherein at least a portion of the working airflow passage is fluidly coupled with a portion of the gas turbine engine outside the engine core.

The gas turbine engine of any preceding clause, further comprising a seal between the outer platform and a housing of the engine core.

The gas turbine engine of any preceding clause, wherein the flow splitter comprises a composite material.

The gas turbine engine of any preceding clause, wherein the composite material comprises graphite fibers and an epoxy resin.

The gas turbine engine of any preceding clause, wherein the set of splitter vanes consists of a first material, and the set of connecting walls consists of a second material different from the first material.

The gas turbine engine of any preceding clause, wherein the set of splitter vanes consists of a first material, and the set of connecting walls consists of a second material that is the same as the first material.

The gas turbine engine of any preceding clause, wherein the rotor is a rotor disk.

The gas turbine engine of any preceding clause, wherein the first blade includes a first dovetail and the second blade includes a second dovetail, and wherein the first dovetail and the second dovetail are each received within the rotor.

A method of operating the gas turbine engine of any preceding clause, the method including directing an inner air flow through the working airflow passage at least to the engine core, and directing an outer air flow through the exterior airflow passage to a portion of the gas turbine engine outside the engine core.

What is claimed is:

1. A gas turbine engine comprising:

a fan section, a compressor section, a combustion section, and a turbine section in serial flow arrangement with the compressor section, the combustion section, and the turbine section defining an engine core, wherein the fan section includes a rotor assembly defining a rotational axis, the rotor assembly comprising:

a first blade having a pressure side and a second blade having a suction side circumferentially spaced about the rotational axis from the pressure side of the first blade to define an intervening gap having a first circumferential length;

a rotor receiving a portion of the first blade and a portion of the second blade; and a flow splitter defined by a second circumferential length less than the first circumferential length, the flow splitter located fully within the intervening gap, wherein the flow splitter defines at least a portion of a working airflow passage fluidly coupled to the engine core, wherein the flow splitter defines at least a portion of an exterior airflow passage that is fluidly coupled with at least a portion of the gas turbine engine downstream of the rotor assembly and outside the engine core, and wherein the flow splitter comprises an inner platform having a first radially inner surface and a first radially outer surface, and an outer platform having a second radially inner surface and a second radially outer surface, the outer platform being radially spaced outwardly from the inner platform.

2. The gas turbine engine of claim 1, wherein the working airflow passage is defined by the inner platform, the first blade, the second blade, and the outer platform.

3. The gas turbine engine of claim 1, wherein the working airflow passage defines a radially innermost airflow passage of the rotor assembly with respect to the rotational axis.

4. The gas turbine engine of claim 3, wherein the rotor assembly further comprises a cavity defined by the inner platform, the first blade, the second blade, and the rotor.

5. The gas turbine engine of claim 1, wherein the exterior airflow passage is defined by the outer platform, the first blade, and the second blade.

6. The gas turbine engine of claim 1, wherein the flow splitter further comprises a support structure extending between the inner platform and the outer platform.

7. The gas turbine engine of claim 6, wherein the support structure comprises a set of connecting walls, each extending radially and coupling the inner platform to the outer platform.

8. The gas turbine engine of claim 7, wherein an intersection between a connecting wall of the set of connecting walls and the inner platform forms an angle in a range from 80° to 100°.

9. The gas turbine engine of claim 6, wherein the inner platform, the outer platform, and the support structure are integrally formed.

10. The gas turbine engine of claim 1, wherein the inner platform and the outer platform each include a pair of wings having a different composition than the respective platform.

11. The gas turbine engine of claim 1, wherein at least one of the inner platform or the outer platform comprises a set of splitter vanes extending radially outwardly with respect to the rotational axis from the at least one of the inner platform or the outer platform.

12. The gas turbine engine of claim 11, wherein a cross-section of each splitter vane of the set of splitter vanes is in a shape of an airfoil, a rectangle, a triangle, a semicircle, an elongated semicircle, or any combination thereof.

13. The gas turbine engine of claim 11, wherein the set of splitter vanes includes at least two splitter vanes that are at least one of radially, axially or circumferentially spaced from each other with respect to the rotational axis.

14. The gas turbine engine of claim 1, wherein a leading edge of at least one of the first blade or the second blade extends axially forward of a leading edge of at least one of the inner platform or the outer platform.

15. The gas turbine engine of claim 1, wherein a leading edge of at least one of the inner platform or the outer platform extends axially forward of a leading edge of at least one of the first blade or the second blade.

16. The gas turbine engine of claim 1, wherein a trailing edge of at least one of the inner platform or the outer platform extends axially aft of a trailing edge of at least one of the first blade or the second blade.

17. The gas turbine engine of claim 1, wherein at least a portion of the working airflow passage is fluidly coupled with a portion of the gas turbine engine outside the engine core.

18. The gas turbine engine of claim 1, further comprising a seal between the outer platform and a housing of the engine core.

19. The gas turbine engine of claim 1, wherein the flow splitter comprises a composite material.

20. A gas turbine engine comprising:

a fan section, a compressor section, a combustion section, and a turbine section in serial flow arrangement with the compressor section, the combustion section, and the turbine section defining an engine core, wherein the fan section includes a rotor assembly defining a rotational axis, the rotor assembly comprising:

a first blade having a pressure side and a second blade having a suction side circumferentially spaced about the rotational axis from the pressure side of the first blade to define an intervening gap;

a rotor receiving a portion of the first blade and a portion of the second blade; and a flow splitter located and sized to fit within a circumferential length of the intervening gap, the flow splitter comprising an inner platform and an outer platform radially spaced and separate from the inner platform, wherein the flow splitter defines at least a portion of a working airflow passage fluidly coupled to the engine core, and wherein the flow splitter defines at least a portion of an exterior airflow passage that is fluidly coupled with at least a portion of the gas turbine engine downstream of the rotor assembly and outside the engine core.

* * * * *